(12) United States Patent
Blanchard et al.

(10) Patent No.: US 11,036,110 B2
(45) Date of Patent: Jun. 15, 2021

(54) ELECTRICALLY TUNABLE IONIC LIQUID OPTICS

(71) Applicant: BOARD OF TRUSTEES OF MICHIGAN STATE UNIVERSITY, East Lansing, MI (US)

(72) Inventors: Gary J. Blanchard, Okemos, MI (US); Greg M. Swain, Owosso, MI (US); Ke Ma, East Lansing, MI (US); Romana Jarosova, East Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 0 days.

(21) Appl. No.: 16/285,729

(22) Filed: Feb. 26, 2019

(65) Prior Publication Data

US 2019/0265530 A1    Aug. 29, 2019

Related U.S. Application Data

(60) Provisional application No. 62/635,840, filed on Feb. 27, 2018.

(51) Int. Cl.
   *G02F 1/139*    (2006.01)
   *G02F 1/29*     (2006.01)
   (Continued)

(52) U.S. Cl.
   CPC .......... *G02F 1/1393* (2013.01); *G02F 1/0123* (2013.01); *G02F 1/1347* (2013.01);
   (Continued)

(58) Field of Classification Search
   CPC .................................................. G02F 1/1393
   See application file for complete search history.

(56) References Cited

U.S. PATENT DOCUMENTS 7,009,750 B1 *   3/2006   Westfall ................ G02F 1/1523
                                                              359/240
7,215,457 B1     5/2007   Westfall et al.
                          (Continued)

FOREIGN PATENT DOCUMENTS

EP    2297747 B1    8/2015
EP    3263535 A1    1/2018

OTHER PUBLICATIONS

Ma et al., "Modulation of an Induced Charge Density Gradient in the Room-Temperature Ionic Liquid BMIM+BF4−," The Journal of Physical Chemistry, Mar. 22, 2018, issue 122, 7361-7367.
(Continued)

*Primary Examiner* — Edmond C Lau
(74) *Attorney, Agent, or Firm* — Marshall, Gerstein & Borun LLP

(57) ABSTRACT

The disclosure relates to electrically tunable optical cells including ionic liquids. The optical cell includes opposing substrates defining an internal cell volume containing the ionic liquid. The optical cell further includes an electrically conductive layer or film on at least one substrate, where the electrically conductive layer is adapted to receive a voltage differential and induced current therethrough. The resulting current through the electrically conductive layer induces a charge density gradient in the neighboring ionic liquid. The refractive index of the ionic liquid in the optical cell can be controlled by adjusting the charge density gradient in the ionic liquid. At least some of the components of the optical cell can be formed from transparent materials, thus providing transmissive or reflective optical cells.

17 Claims, 7 Drawing Sheets

(51) Int. Cl.
*G02F 1/1523* (2019.01)
*G02F 1/1347* (2006.01)
*G02F 1/01* (2006.01)
*G02F 1/1337* (2006.01)

(52) U.S. Cl.
CPC ...... *G02F 1/133723* (2013.01); *G02F 1/1525* (2013.01); *G02F 1/29* (2013.01)

(56) References Cited

U.S. PATENT DOCUMENTS

| | | | |
|---|---|---|---|
| 7,430,370 B2 | 9/2008 | Kato et al. | |
| 7,450,292 B1 | 11/2008 | Burrell et al. | |
| 8,441,707 B2 * | 5/2013 | Lam | G02F 1/157 359/241 |
| 2008/0266642 A1 * | 10/2008 | Burrell | B60R 1/088 359/270 |
| 2018/0088428 A1 * | 3/2018 | Kim | G02F 1/1506 |

OTHER PUBLICATIONS

Ma et al., "Charge-Induced Long-Range Order in a Room-Temperature Ionic Liquid," Langmuir ACS Publication, Aug. 26, 2016, 32, 37, 9507-9512.
Ma et al., "Ionic Liquids. A Unique and Useful Class of Materials," Chem. Educator 2018, 23, 1-8.
Alkeskjold et al., "Integrating liquid crystal based optical devices in photonic crystal fibers," Opt Quant Electron (2007) 39:1009-1019.
Hu et al., "Ionic liquid based variable focus lenses," www.rsc.org/softmatter, *Soft Matter*, 2011, 7, 5941.

* cited by examiner

ELECTRICALLY TUNABLE IONIC LIQUID OPTICS

CROSS REFERENCE TO RELATED APPLICATION

Priority is claimed to U.S. Provisional Application No. 62/635,840 (filed Feb. 27, 2018), which is incorporated herein by reference in its entirety.

STATEMENT OF GOVERNMENT INTEREST

This invention was made with government support under EY016077 and under EY025383 awarded by the National Institutes of Health, and under W911NF-14-1-0063 awarded by the U.S. Army Research Laboratory. The government has certain rights in the invention.

BACKGROUND OF THE DISCLOSURE

Field of the Disclosure

The disclosure relates to electrically tunable optical cells including ionic liquids. The optical cell includes opposing substrates defining an internal cell volume containing the ionic liquid. The optical cell further includes an electrically conductive layer or film on at least one substrate, where the electrically conductive layer is adapted to receive a voltage differential and induced current therethrough. The resulting current through the electrically conductive layer induces a charge density gradient in the neighboring ionic liquid. The refractive index of the ionic liquid in the optical cell can be controlled by adjusting the charge density gradient in the ionic liquid. At least some of the components of the optical cell can be formed from transparent materials, thus providing transmissive or reflective optical cells.

SUMMARY

In an aspect, the disclosure relates to an electrically tunable optical cell comprising: a first transparent substrate; a second transparent substrate opposing and spaced apart from the first transparent substrate, wherein the first transparent substrate and the second transparent substrate define an internal cell volume therebetween; an ionic liquid in the internal cell volume; a first transparent layer (or film) on a surface of the first transparent substrate facing the internal cell volume, wherein: the first transparent layer is electrically conductive, and the first transparent layer is adapted to receive a voltage differential across the first transparent layer and capable of inducing an electrical current through the first transparent layer; and optionally a second transparent layer (or film) on a surface of the second transparent substrate facing the internal cell volume, wherein the second transparent layer is electrically conductive. This optical cell represents a transmissive optical cell in which the first and second substrates and layers are transparent, able to transmit (substantially) all incident light thereon. More specifically, the first and second transparent substrates are sized and positioned relative to each other such that there exists an optical path for incident light on an external surface of one of the transparent substrates to pass through the transparent substrate (and its corresponding transparent layer), pass through the internal cell volume, pass through the opposing transparent substrate (and its corresponding transparent layer), and exit the opposing transparent substrate at an external surface thereof.

In another aspect, the disclosure relates to an electrically tunable optical cell comprising: a first substrate (e.g., opaque or transparent); a second transparent substrate opposing and spaced apart from the first substrate, wherein the first substrate and the second transparent substrate define an internal cell volume therebetween; an ionic liquid in the internal cell volume; a first opaque layer (e.g., or film; a reflective layer or film) on a surface of the first substrate facing the internal cell volume, wherein: the first opaque layer is electrically conductive (e.g., a thin film of metal such as silver), and the first opaque layer is adapted to receive a voltage differential across the first opaque layer and capable of inducing an electrical current through the first opaque layer; and optionally a second transparent layer (or film) on a surface of the second transparent substrate facing the internal cell volume, wherein the second transparent layer is electrically conductive. In a further alternative embodiment, the first layer could be transparent as above, and the first substrate could instead be opaque or reflective. This optical cell represents a reflective optical cell in which the first substrate or the first layer is opaque (or reflective) and reflects some or (substantially) all incident light thereon. More specifically, the first and second substrates are sized and positioned relative to each other such that there exists an optical path for incident light on an external surface of the second transparent substrate to pass through the second transparent substrate (and second layer if present), pass through the internal cell volume, reflect off the first substrate or the first layer, pass back through the internal cell volume, pass back through the second transparent substrate (and second layer if present), and exit the second transparent substrate at an external surface thereof.

In another aspect, the disclosure relates to an electrically tunable optical cell comprising: a first transparent substrate; a second substrate opposing and spaced apart from the first transparent substrate, wherein the first transparent substrate and the second substrate define an internal cell volume therebetween; an ionic liquid in the internal cell volume; a first transparent layer (or film) on a surface of the first transparent substrate facing the internal cell volume, wherein: the first transparent layer is electrically conductive, and the first transparent layer is adapted to receive a voltage differential across the first transparent layer and capable of inducing an electrical current through the first transparent layer; and optionally a second layer (or film) on a surface of the second substrate facing the internal cell volume, wherein the second layer is electrically conductive; wherein at least one of the second substrate and the second layer is opaque (e.g., reflective; a thin film of metal such as silver for the second layer). This optical cell represents a reflective optical cell in which the second substrate or the second layer is opaque (or reflective) and reflects some or (substantially) all incident light thereon. More specifically, the first and second substrates are sized and positioned relative to each other such that there exists an optical path for incident light on an external surface of the first transparent substrate to pass through the first transparent substrate (and first layer), pass through the internal cell volume, reflect off the second substrate or the second layer, pass back through the internal cell volume, pass back through the first transparent substrate (and first layer), and exit the first transparent substrate at an external surface thereof.

The first and second (transparent or opaque) substrates can independently have flat or curved (e.g., concave or convex) opposing external surfaces that can be parallel or not. For example, the first and second substrates generally can have any suitable rectangular/planar structure for light transmission or reflection, a suitable (curved) lens structure for light focusing or de-focusing/dispersion, or a combination of both (e.g., one generally rectangular/planar substrate and on curved substrate).

The internal cell volume is generally a sealed volume that can be enclosed with any suitable structure/material (generally electrically non-conducting) that can be part of or separate from the first and second (transparent or opaque) substrates. For example, an O-ring or other sealing structure around the periphery of the internal cell volume can be placed between the first and second substrates in combination with some adhesive and/or mechanical fasteners to hold the optical cell together as a unitary structure. In other embodiments, one or both of the first and second substrates can have vertically extending sidewall structures at the periphery of the internal cell volume so that the first and second substrates together form the sealed internal cell volume. In other embodiments, the first and second substrates can be opposing and spaced apart regions of a single piece of (transparent or opaque) material having a cavity therein corresponding to the internal cell volume, and the first and second (transparent or opaque) layers can be coated on an interior cavity surface.

Suitably, the ionic liquid (or a single liquid phase containing the ionic liquid) completely fills the internal cell volume. For example, the internal cell volume is suitably free from additional fluid (e.g., gas or liquid) phases in the internal cell volume that are immiscible with the ionic liquid (e.g., an immiscible liquid; a separate gas phase (headspace)).

The first layer can be in (direct) contact with the ionic liquid in the internal cell volume. When present, the second layer can be in (direct) contact with the ionic liquid in the internal cell volume. When absent, the second substrate can be in (direct) contact with the ionic liquid in the internal cell volume.

The optical cell can include two or more generally opposing electrical leads, wires, connectors, etc. in contact with the first (transparent or opaque) layer, such as on opposing lateral sides of the first layer, which electrical leads can be electrically connected to an external voltage or power source to apply the voltage differential and induce the resulting current. The current generally flows through the first layer in a direction that is in a direction or plane that is parallel to the (local) surface plane defined by the first layer. The second (transparent or opaque) layer can be adapted or not to receive a voltage differential across the second layer and capable of inducing an electrical current through the second transparent layer. In an embodiment, the second layer is present and not electrically connected to an external voltage or power source.

Various refinements of the electrically tunable optical cells are possible.

In a refinement, the first transparent substrate and the second transparent substrate independently comprise a material selected from glass, (optical grade) polymers, diamond, and combinations thereof (e.g., as layered composite materials). Example optical grade polymers/plastics can include polycarbonate (PC), polystyrene (PS), and acrylics such as poly(methyl methacrylate) (PMMA). Diamond can be used as a substrate, for example a single crystal diamond or polycrystalline diamond substrate formed without any electrically (semi)conducting dopants such as boron (p-type dopant) or phosphorous (n-type dopant). In an embodiment, a non-conductive diamond substrate can be grown/synthesized (e.g., using microwave plasma assisted chemical vapor deposition, such as with a deposition source gas free from (semi)conductive dopants), and then the deposition source gas can be changed to include a p- or n-type dopant to deposit a very thin transparent, conducting diamond layer thereon. The first and second substrates can be formed from the same or different materials, and they can either include or be formed exclusively from the foregoing specific materials or combinations thereof.

In a refinement, the first (transparent or opaque) substrate and the second (transparent or opaque) substrate are electrically non-conductive. The substrate can be formed from non-conductive materials, such as those having an electrical conductivity of about $10^{-8}$ S/m or less. For example, glass has representative electrical conductivity values of about $10^{-11}$ S/m to $10^{-15}$ S/m, and diamond has representative values of about $10^{-11}$ S/m to $10^{-18}$ S/m. Suitable resistances for the substrates can be at least 1, 2, or 5 $\Omega$/sq. and or up to 10, 20, or 50 $\Omega$/sq. (e.g., sheet resistance expresses as ohms-per-square, such as determined by a four point probe technique).

In a refinement, the first (transparent or opaque) substrate and the second (transparent or opaque) substrate are spaced apart by a distance of at least 50 μm. The separation distance preferably is comparable to or higher than the length scale over which the charge density gradient is non-zero as measured from the first substrate/first layer, which is at least about 50-100 μm. Local regions where the charge density gradient is non-zero correspond to the local regions where the index of refraction of the ionic liquid can be controlled or adjusted. Suitably, the distance is at least 50, 100, 150, or 200 μm and/or up to 100, 200, 300, 500, 1000, or 2000 μm. Distances greater than the thickness of the region where charge density gradient is non-zero can be practical or desirable from a manufacturing/assembly perspective, even if they result in regions in the internal cell volume where, during operation, the charge density gradient is essentially zero and there is little or no local control over the index of refraction in the local region. The separation distance can be the shortest or average distance when the two substrates are not spaced apart by a uniform distance across their entire surfaces, such as when at least one substrate has a curved surface facing the internal cell volume and/or when the two substrates are generally angled/non-parallel relative to each other.

In a refinement, the ionic liquid comprises a cationic moiety selected from the group consisting of a pyridinium, pyridazinium, pyrimidinium, pyrazinium, oxazinium, thiazinium, imidazolium, pyrazolium, thiazolium, isothiazolium, oxazolium, isoxazolium, and triazolium cationic moieties. Ionic liquids are typically colorless. In a further refinement, the ionic liquid further comprises one or more organic substituents selected from the group consisting of alkyl groups and aryl groups. Organic substituents can be pendant groups from the cationic moiety, in particular a pendant group from one or more ring carbon atoms or ring (positively charged) nitrogen atoms replacing a hydrogen atom. Each organic substituent independently may be linear or branched alkyl of 1 to 20 carbon atoms (e.g., substituted or unsubstituted), aryl of 6 to 20 carbon atoms (e.g., substituted or unsubstituted). In a further refinement, the ionic liquid further comprises a counter anion selected from the group consisting of sulfate, hydrogen sulfate, nitrate, fluoride, chloride, bromide, iodide, methyl sulfonate, and fluoroborate anions. Other counter anions can include $CN^-$, $NCS^-$, $NCO^-$, $OCN^-$, $(CF_3SO_2)_2N^-$, and $PF_6^-$.

In a refinement, the internal cell volume is substantially free from materials other than ionic liquids. For example, the internal cell volume can be full or substantially full (such as having no air or other gas headspace or pockets) with the ionic liquid, which can include a mixture of two or more different ionic liquid species. Suitably, any components other than ionic liquids are present in amount of 5, 2, 1, or 0.1 wt. % or less based on the weight of the liquid medium containing the ionic liquid(s) (e.g., free from such other additional components). Similarly, the internal cell volume suitably is free from other liquids of liquid phases immiscible with the liquid medium containing the ionic liquid(s).

In a refinement, the first transparent layer and the second transparent layer (when present) independently comprise a material selected from the group consisting of transparent conductive metal oxides, transparent conductive polymers, transparent semiconducting diamonds, transparent conductive carbons, transparent metal films, and combinations thereof (e.g., as blends or mixtures). The transparent materials can be transparent in their bulk form, or they can be sufficiently thin layers to be essentially transparent as applied to their substrates (e.g., thin enough to have an optical density of 0.1 or less). Example transparent conductive metal oxides can include indium tin oxide (ITO; or tin-doped indium oxide), fluorine-doped indium tin oxide (FTO), indium zinc oxide (IZO), aluminum zinc oxide (AZO). Example transparent semiconducting conductive polymers can include polyacetylenes, polyphenylene vinylenes, polypyrroles, polythiophenes, polyanilines, and polyphenylene sulfides. Example transparent semiconducting diamonds can include boron-doped diamond (p-type dopant) or phosphorous-doped diamond (n-type dopant). Example transparent conductive carbons can include graphene films and carbon nanotube films that are thin enough to be transparent. Example transparent metal films can include evaporated metal film thin enough to be transparent. In other embodiments, metal films (e.g., silver) or other materials that are conductive but non-transparent (e.g., due to their thickness or otherwise) can be used as an opaque or reflective layer in a reflective optical cell according to the disclosure. The first and second (transparent or opaque) layers can be formed from the same or different materials, and they can either include or be formed exclusively from the foregoing specific materials or combinations thereof.

In a refinement, the first (transparent or opaque) layer and the second (transparent or opaque) layer (when present) independently have an electrical conductivity of about $10^4$ S/m or more (e.g., about $10^4$ S/m, $10^5$ S/m, or $10^6$ S/m or more and/or up to about $10^6$ S/m, $10^7$ S/m, or $10^8$). For example, electrical conductivity values of about $10^5$-$10^6$ S/m are representative for various transparent conducting metal oxides and values of about $10^5$ S/m are representative for graphite. In some embodiments, materials with relatively lower electrical conductivity values can be used, in particular with relatively low thickness values (e.g., thus increasing the fraction of surface atoms/molecules, even if at a relatively lower current values).

In a refinement, the first (transparent or opaque) layer and the second (transparent or opaque) layer (when present) independently have a thickness of 10 μm or less (e.g., 10, 5, 2, 1, 0.5, 0.2, 0.1, 0.05, 0.02, 0.01 μm or less and/or 0.3, 0.5, 1, 2, 5, 10, 20, 50, 100, 200, 500, or 1000 nm or more.) Thin films are suitable, because surface charge in the layer mediates the charge density gradient in the ionic liquid, not buried charge. Thus, the first and second (transparent or opaque) conducting layers are suitably as thin as possible, because it is the external surface of the layer (i.e., facing the internal cell volume and in contact with the ionic liquid) where the electrical current/charge density is relevant for inducing the charge density gradient in the adjacent ionic liquid. A lower limit of a monolayer of material (e.g., being a single atom, molecule, lattice unit, monomer unit, etc. thick) would have only external surface conduction. Bilayers or other multilayers of material only several atomic, molecular, lattice, monomer layers (e.g., 2-10) thick similarly would be suitable for increasing the relative fraction external surface conduction.

In a refinement, the first transparent layer and the second transparent layer (when present) independently have an optical transmittance of at least 80% (e.g., at least 80, 85, 90, or 95% and/or up to 90, 95, 98, 99, or 100%).

In a refinement, the second (transparent or opaque) layer is present in the optical cell.

In a refinement, the optical cell further comprises a voltage source electrically connected to the first (transparent or opaque) layer and adapted to apply a voltage differential across the first (transparent or opaque) layer and induce an electrical current through the first (transparent or opaque) layer. For example, the voltage source can be electrically connected at two or more locations of the first layer, such as via electrical leads, wires, connectors, etc. in contact with the first layer.

In a further refinement, the second (transparent or opaque) layer is present and is not in electrical connection with the voltage source. For example, the second layer can be not electrically connected to any voltage or power source, whether the source connected to the first layer or otherwise, and there is no external means to drive a current across the second layer.

In an alternative further refinement, the second (transparent or opaque) layer is present and is in electrical connection with the voltage source, which is further adapted to apply a voltage differential across the second (transparent or opaque) layer and induce an electrical current through the second (transparent or opaque) layer. For example, the second layer can be electrically connected at two or more locations of the second layer, such as via electrical leads, wires, connectors, etc. in contact with the second layer. The applied voltage need not be the same across both layers (i.e., the applied voltages can be independently controlled to be the same or different from each other). The voltage source can be a single apparatus capable of delivering multiple applied voltages or a plurality of apparatus each capable of delivering one or more applied voltages to the different layers.

In another aspect, the disclosure relates to an electrically tunable optical cell array comprising: a plurality of optical cells according to any of the variously disclosed embodiments. The optical cells can be arranged in any desired manner in the array, for example optically in series, in parallel, or a combination of both. Optical cells arranged optically in series are positioned such that light traversing a first optical cell becomes the incident light into a second optical cell in series. Optical cells arranged optically in parallel are positioned such that light traversing a first optical cell does not enter into a second optical cell in parallel.

In a refinement, the optical cell array further comprises a voltage source electrically connected to the first (transparent or opaque) layers of the plurality of optical cells and adapted to apply voltage differentials across the first (transparent or opaque) layers and induce electrical currents through the first (transparent or opaque) layers. For example, the voltage source can be electrically connected at two or more locations of each first layer, such as via electrical leads, wires, connectors, etc. in contact with each first layer. The applied voltage need not be the same across each layer (i.e., the applied voltages can be independently controlled to be the same or different from each other). The voltage source can be a single apparatus capable of delivering multiple applied voltages or a plurality of apparatus each capable of delivering one or more applied voltages to the different layers.

In another aspect, the disclosure relates to a method for controlling index of refraction of an optical cell, the method comprising: providing an optical cell according to any of the variously disclosed embodiments; and applying a voltage differential across the first (transparent or opaque) layer and inducing an electrical current through the first (transparent or opaque) layer, thereby further inducing a charge density gradient in the ionic liquid and changing the index of refraction of the ionic liquid in the internal cell volume. The change in index of refraction of the ionic liquid can be expressed relative to the ambient/bulk index of refraction value for the ionic liquid in the absence of any charge density gradient. The change in index of refraction can be an increase or decrease relative to the ambient/bulk value.

While the disclosed apparatus, compounds, methods and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein.

Figure 1A:
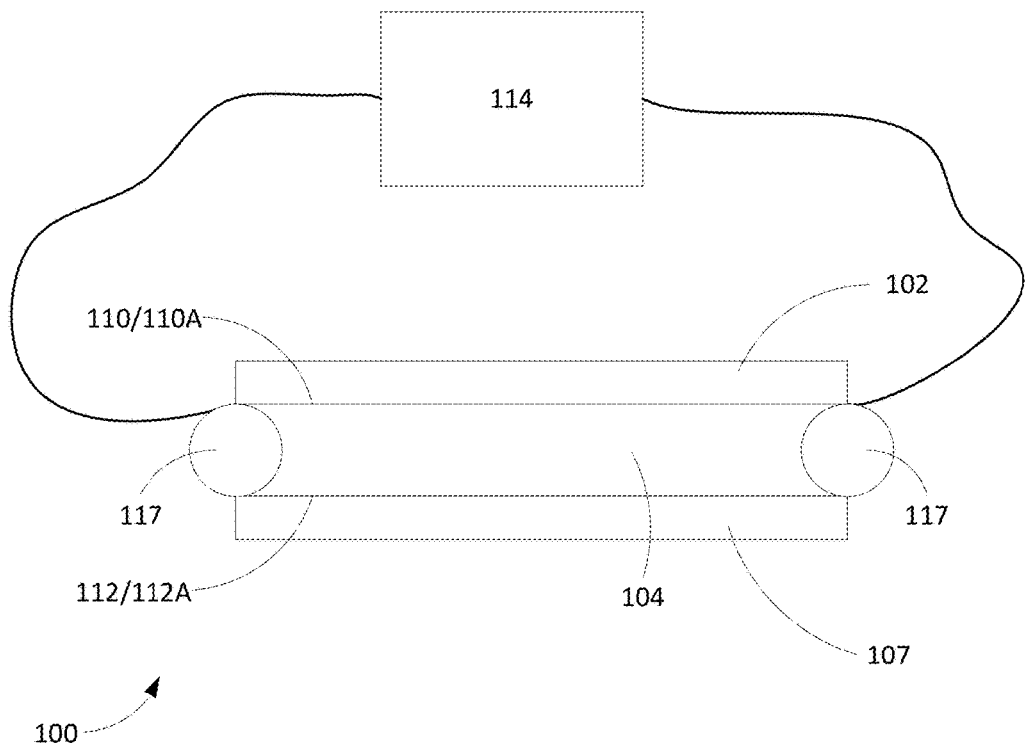
FIG. 1A is a side view of an electrically tunable ionic liquid optical cell configured as an electrically resistive device with a first and second substrate, an internal cell volume containing an ionic liquid, and a voltage supply providing an electrical connection to the first substrate.

While the disclosed apparatus and methods and are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

DETAILED DESCRIPTION

The refractive index of ionic liquids can be controlled over macroscopic distances by controlling the potential gradient in which the ionic liquid resides. The ability to apply potential-dependent control over the refractive index of an ionic liquid is implemented in voltage- and current-controlled transmissive or reflective optics, for example including lenses with voltage-controlled focal lengths, and birefringent filters with voltage controlled birefringence.

Room temperature ionic liquids (RTILs) are salts that exist in a liquid state at room temperature conditions. While most common liquids such as water are generally electrically neutral, ionic liquids have a high concentration of ions and are therefore electrically charged. Due to the high charge densities of ionic liquids, RTILs can be useful in a number of applications including battery technologies, dispersing agents, solar thermal energy, supercapacitor technologies, fuel processing, pharmaceuticals, and electro-optics, among others. One property of interest of RTILs, for the disclosed optical devices, is the ability of RTILs to exhibit long-range order or organization.

Organization or order, for the embodiments herein, is understood to be the order or organization of a charge density gradient throughout a volume of an RTIL. Current models of RTILs are only able to explain charge gradient organization on the order of 5 to 10 nm in length, and the models are unable to explain the organization of charge gradients of lengths in RTILs on the scale of 1 to 100 microns, which is highly unusual for a fluid medium. The current paradigm and treatment of RTILs as liquids does not provide an understanding of the organization of free charge density gradients over lengths greater than 100 micron. The embodiments presented herein provide the means for creating large scale, greater than 10 micron (e.g., up to 10-500 or 50-200 micron), charge density gradients in RTILs enabling the control of the refractive index of the RTILs, and therefore providing a means for generating electrically tunable ionic liquid optical cells, which in turn allows control or selection of the index of the refraction of the ionic liquid.

A charged surface can induce a charge density gradient ($\rho_f$) in an RTIL normal to the charged surface (e.g., charged planar silica surface). The induced charge gradient in the RTIL may alter the index of refraction of the RTIL, thus changing the trajectory of light incident on or propagating through the RTIL. In some embodiments, the RTIL may transmit, reflect, refract and/or absorb light incident on or propagating through the RTIL. The illustrative embodiments herein demonstrate the ability to control over the sign and magnitude of the induced charge density gradient in an RTIL. The spatial extent of the charge density gradient can extend to and exceed 100 μm from the charged surface. The spatial extent of the charge density gradient is characterized through the rotational diffusion time constant gradient of a cationic chromophore in the RTIL. The cationic chromophore used in the illustrative embodiments for rotational diffusion time characterization is not required in a working electrically tunable optical cell to either induce a charge density gradient or correspondingly control the index of refraction of the RTIL. The cationic chromophore used in the illustrative embodiments simply serves as an indicator to demonstrate induction of a charge density gradient during operation of the optical cell. The ability to control the sign and magnitude of the charge density gradient is in turn controlled by the surface charge density of the charged surface adjacent to the ionic liquid and normal to the charge density gradient. Transparent conductive surfaces (FTO and ITO coated on glass) were used as supports in the illustrative examples below and demonstrate control over the charge carrier density of the supports.

In electromagnetics, it is common to distinguish a frequency, wavelength, energy, and color of electromagnetic radiation. Each of these four characteristics is related to the other three. For example, the wavelength, in nanometers (nm), and frequency, in hertz (Hz), for a specified electromagnetic radiation are inversely proportional to each other. Similarly, the energy, in electron-volts (eV) or joules (J), of electromagnetic radiation is proportional to the frequency of that radiation. Therefore, for a given radiation at a given frequency, there is a corresponding wavelength and energy.

The fourth of the aforementioned characteristics, color, typically represents a group or band of frequencies or wavelengths. For example, the color blue is commonly defined as electromagnetic radiation with a wavelength from 450 nm to 495 nm. This wavelength band also corresponds to frequencies from 606 THz to 668 THz, and energies of 2.5 to 2.75 eV. The color blue, then, is any radiation with one of those wavelengths, or radiation with multiple wavelengths in that band. Therefore, the term color may refer to one specific wavelength, or a band of wavelengths. Some areas of trade in electromagnetics prefer the use of one of the four terms over the others (e.g., color and wavelength are preferred when discussing optical filters, whereas frequency and energy are preferred when optical excitation processes). Therefore, the four terms may be understood to be freely interchangeable in the following discussion of electromagnetic radiation and optical semiconductor devices. In addition, the terms light, electromagnetic radiation, electromagnetic wave, and radiation may be understood to be freely interchangeable, as would be understood by a person of skill in the art.

FIG. 1A is a side view of an embodiment of an electrically tunable ionic liquid optical cell 100 with a first substrate 102 with a first internal surface 110, a second substrate 107 with a second internal surface 112 opposing the first internal surface 110, and an internal cell volume 104 defined as the volume between the first internal surface 110 and the second internal surface 112. A sealing structure 117 may separate the first substrate 102 and the second substrate 107 and provide side walls or a seal around the internal cell volume 104 allowing the internal cell volume 104 to contain an RTIL. One example of a suitable sealing structure 117 for sealing the internal cell volume 104 is a synthetic rubber O-ring. In other embodiments the first and second substrates 102 and 107 may have extending side walls or be a single piece of a material. In any embodiment, it is desirable for the first and second internal surfaces 110 and 112 to be electrically independent and, therefore, that no significant electrical current flows or is capable of flowing through the internal cell volume 104, sealing structure 117, or sidewalls from the first internal surface 110 to the second internal surface 112. Therefore, it is generally desirable that the sealing structure 117 be electrically non-conductive (e.g., a rubber O-ring). The sealing structure may also be held in place by a clamp or pressure from the first and second substrates 102 and 107, by an adhesive, by a mechanical fastener, or any other way to hold the sealing structure 117 in place and to seal the internal cell volume 104.

In the embodiment of the electrically tunable ionic liquid optical cell 100 of FIG. 1A, a voltage source 114 is configured to provide a voltage across the first substrate 102 inducing a current through the first substrate 102. In embodiments, the voltage source 114 may be configured to provide a voltage across the first internal surface 110 of the first substrate 102 inducing a current across the first internal surface 110 of the optical cell 100. The surface charge density on the first internal surface 110 may induce a charge gradient in the RTIL contained in the internal cell volume 104. The resistance of, and the voltage across the first substrate 102 determine the current through the first substrate 102, and more importantly, the current across the first internal surface 110. In embodiments, the bulk of the first substrate 102 is electrically non-conductive, while a localized portion of the first substrate 102 at and near the first internal surface 110 is electrically conductive, for example based on the presence of a first transparent, electrically conductive layer at the first internal surface 110. In such embodiments, the current across the first substrate 102 is localized in a region at and near the first internal surface 110 such that there is essentially no current in the other bulk portions of the first substrate 102. It should be noted that it is the surface charge density on the first internal surface 110 that mediates the charge density gradient in the RTIL, and due to the material properties of the first substrate 102 (e.g., dopant level, grain boundaries, defects), only a fraction of the current passes across the first internal surface 110. In the embodiment of the optical cell 100 of FIG. 1A, the surface charged density depends on the resistance of the first substrate 102, in particular the resistance at and near the first internal surface 110, and therefore the optical cell 100 of FIG. 1A is configured as, and referred to herein, as a resistive device or a resistive configuration.

Figure 1B:
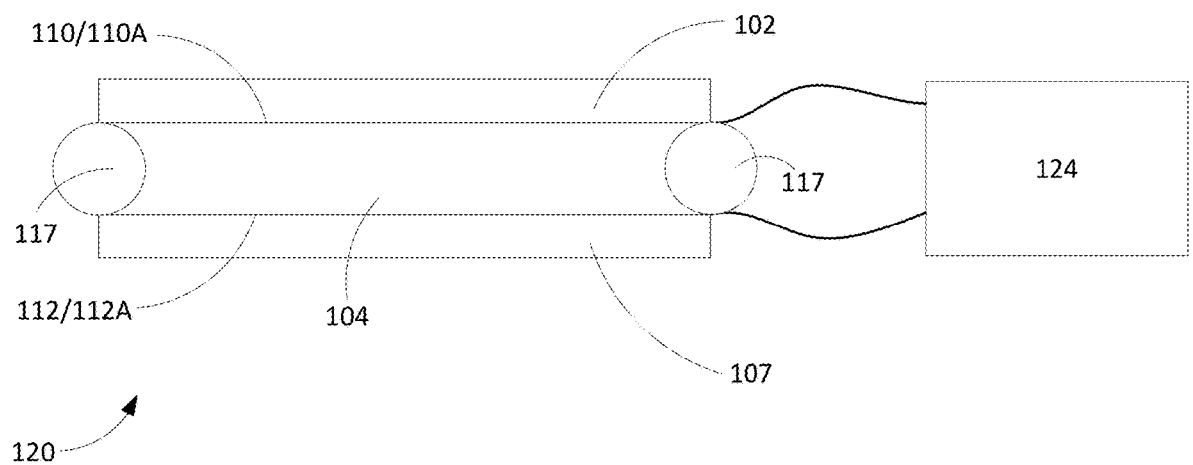
FIG. 1B is a side view of an ionic liquid optical cell configured as an electrically capacitive device with a first and second substrate, an internal cell volume containing an ionic liquid, and a voltage supply providing an electrical connection to both the first and second substrates.

Alternatively, as FIG. 1B illustrates, a voltage source 124 may be configured to provide a voltage across the first and second substrates 102 and 107 of an optical cell 120. The voltage source 124 induces a voltage differential across the first and second internal surfaces 110 and 112 and causes charge to build up on the first and second surfaces according to the relationship $Q=CV$, where Q is the net charge on a surface, C is the capacitance between the first and second substrates 102 and 107, and V is the voltage differential or potential difference between the first and second internal surfaces 110 and 112. In the embodiment of the optical cell 120 of FIG. 1B, the surface charge density depends on the capacitance between the first and second internal surfaces 110 and 112, and therefore, the optical cell 120 of FIG. 1B is configured as, and referred to herein, as a capacitive device or capacitive configuration.

Referring now simultaneously to FIGS. 1A and 1B, the first substrate 102 and/or second substrate 107 may be in direct contact with an ionic liquid or RTIL contained within the internal cell volume 104. When present, a first layer or film 110A on the first internal surface 110 may be in direct contact with the ionic liquid or RTIL in the internal cell volume 104, and/or a second layer or film 112A on the second internal surface 112 may be in direct contact with an ionic liquid or RTIL contained within the internal cell volume 104. In various embodiments, the first layer 110A and the second layer 112A can be transparent or opaque and/or electrically conductive or electrically non-conductive. Although described here in reference to FIGS. 1A and 1B, an ionic liquid or RTIL contained within an internal cell volume may be in contact with any number of substrates, films, layers, or internal surfaces of any embodiment of an electrically tunable ionic liquid optical cell described herein.

Embodiments of optical cells configured as capacitive devices, such as the optical cell 120 of FIG. 1B, may provide a limited ability to control the surface charge density on the first and second internal surfaces 110 and 112. For example, in an embodiment, the first internal surface 110 may be a conductive surface coated with indium tin oxide (ITO) or fluorine tin oxide (FRO). The capacitive optical cell 120 of FIG. 1B has a capacitance of $C/A=\varepsilon\varepsilon_o/d$. For 1 cm² ITO-coated glass, RTIL thickness of 1 mm, and with an RTIL dielectric constant of $\varepsilon=10$, the capacitance of the optical cell 120 of FIG. 1B is C=9 pF/cm². Using Q=CV, and applying 1 V across the first and second surfaces 110 and 112, the surface charge density is $5.6\times10^{-7}$ e⁻/cm². Taking the ambient charge of ITO to be similar to the ambient charge of silica ($3\times10^{14}$ anions/cm²), the resulting surface charge density is only 1 ppm of the ambient surface charge density of the first and second internal surfaces 110 and 112. A greater induced-to-ambient surface charge density ratio is generally desirable to induce a charge gradient in an RTIL inside of the internal cell volume 104 of the capacitive device configuration demonstrated by the optical cell 120 in FIG. 1B.

Referring now again to FIG. 1A, the electrically tunable ionic liquid optical cell 100 that is configured as a resistive device. The voltage source 114 may provide a voltage across the first internal surface 110 of the first substrate 102 causing a current to flow across the first internal surface 110. A surface charge density on the first internal surface 110 may generate a charge density gradient in an RTIL contained within the internal cell volume 104. The surface charge density on the first internal surface 110 can be controlled by controlling the current passing along the first internal surface 110. Using the definition of electrical current, $I=Q/t$, and Ohm's Law, $V=IR$, the surface charge density on the internal surface can be determined. In an embodiment, the first substrate 102 may be silica (e.g., glass). In embodiments, it is desirable to have an induced surface charge density on the same order of magnitude as the intrinsic charge density of the substrate material's internal surface 110 to induce any detectable change in a charge density gradient in an RTIL contained within the internal cell volume 104. For example, in an embodiment that employs silica as the first substrate 102, the intrinsic surface charge density of silica is on the order of $10^{14}$ e⁻/cm², which for the resistive device of FIG. 1A results in a current density of $1.6\times10^{-5}$ C/cm²-s. In embodiments, an electrically conductive, optically transparent material layer 110A may be coated on the first internal surface 110. In embodiments with a conductive coating 110A on the first internal surface 110, the voltage source 114 may provide a voltage across, and therefore current along, the electrically conductive coating 110A on the first internal surface 110. In embodiments, the electrically conductive, optically transmissive coating 110A may be indium tin oxide (ITO). The resistance of a 1 cm² thin layer of ITO is estimated to be around 10Ω. Due to the small resistance of the ITO layer it may be desirable to place a resistor with greater resistance in series with the ITO layer to prevent excessive current and heat generation in the ITO layer. Providing 200 mV across the ITO layer on the first internal layer 110, and placing a 12.5 kΩ resistor in series with the ITO layer, the current across the ITO layer is determined to be $1.6\times10^{-5}$ e⁻/s. Therefore, it is evident that electrically resistive configurations of optical cells may require less applied voltage than an electrically capacitive configuration to induce a charge gradient in an RTIL contained within an internal cell volume 104. The amount of applied voltage, and therefore induced current, depends on the desired surface charge density on the internal surface 102. A desired surface charge density is a surface charge density that is capable of inducing a charge gradient in an RTIL that affects the RTILs optical properties in a desired way, e.g. to induce an increase in the index of refraction, to induce a decrease in the index of refraction, to induce a charge gradient of a certain strength, distance, or depth, etc.

Figure 2A:
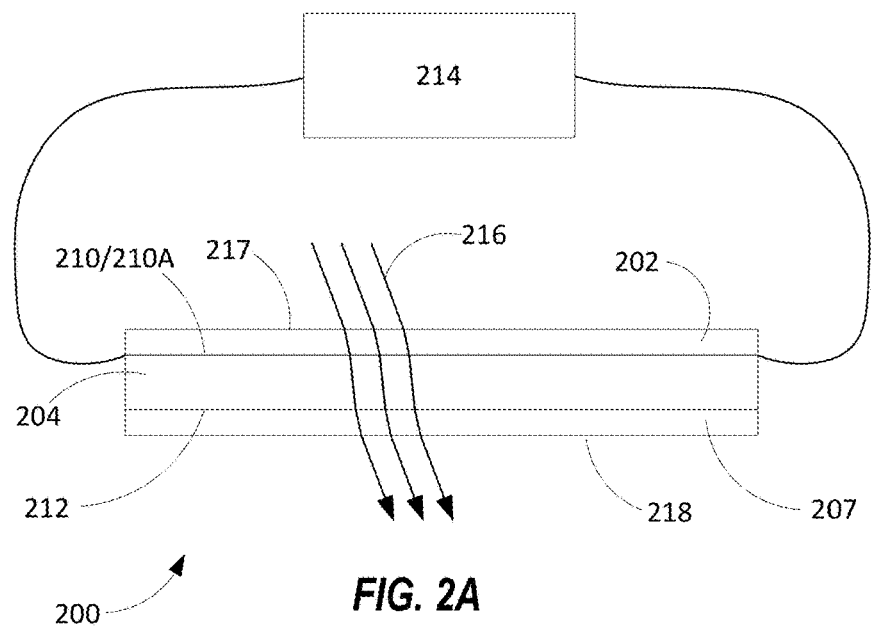
FIG. 2A is a side view a transmissive electrically tunable ionic liquid optical cell configured as an electrically resistive device with a first and second transparent substrate, an internal cell volume containing an ionic liquid, and a voltage supply providing an electrical connection to the first transparent substrate.

FIG. 2A is a side view of an embodiment of a transmissive optical cell 200, with a first transparent substrate 202 and a second transparent substrate 207 that opposes the first transparent substrate 202 and is spaced apart from, and therefore not in direct contact with, the first transparent substrate 202. The first transparent substrate 202 has a first transparent internal surface 210, and the second transparent substrate 207 has a second transparent internal surface 212. The first and second internal surfaces 210 and 212 are opposing, parallel, and configured as two boundaries of an internal cell volume 204, which may contain an ionic liquid, and more specifically, an RTIL. The first transparent internal surface 210 may be coated with an electrically conductive first transparent layer or film 210A facing the internal cell volume 204. A voltage source 214 may be electrically connected to the first transparent internal surface 210 to provide a voltage across the first transparent internal surface 210, therefore inducing an electrical current through the layer or film 210A on the first transparent internal surface 210. The transmissive optical cell 200 of FIG. 2A is one embodiment of an optically transparent optical cell able to transmit incident light 216 on a first transparent external surface 217 of the first transparent substrate 202 through the first transparent substrate 202, through the first transparent internal surface 210 and layer 210A, through the internal cell volume 204 containing an RTIL, through the second transparent internal surface 212, through the second transparent substrate 207, and exit the optical cell 200 through a second external transparent surface 218 of the second transparent substrate 207. Similarly, although not illustrated in FIG. 2A, the optical cell 200 of FIG. 2A may transmit incident light 216 on the second transparent external surface 218 through the second transparent substrate 207, through the second transparent internal surface 212, through the internal cell volume 204 containing an RTIL, through the first transparent internal surface 210 and layer 210A, through the first transparent substrate 202, and exit the optical cell 200 through the first transparent external surface 217 of the first transparent substrate 202. In other embodiments, a second transparent electrically conductive layer on the second transparent internal surface 212 may be implemented in electrically capacitive or resistive configurations, to provide a voltage to and/or a current across the conductive layer on the second transparent internal surface 212.

The resistive, transparent optical cell 200 may be used to transmit light, refract light, and/or reflect light depending on the intrinsic or induced index of refraction of an RTIL in the internal cell volume 204. If the RTIL has the same index of refraction as the first and second substrates 202 and 207, incident light 216 may pass directly through the device with little or no refraction between the first and second substrates 202 and 207 and the RTIL. Any difference in the index of refraction of the region outside of the optical cell 200, the first and second transparent substrates 202 and 207, and the RTIL contained within the internal cell volume 204 will cause light to refract and propagate at different angles in the different materials. The refraction of light is qualitatively depicted in FIG. 2A as the incident light 216 propagates from the first transparent substrate 202, to the RTIL contained within the internal cell volume 204. For simplicity, other figures may not explicitly illustrate the refraction of light in optical cell, but it should be understood that refraction of light does occur at any boundary of materials that have two non-equal indices of refraction. Further, as one of ordinary skill in the art would understand, depending on various indices of refraction and angles of propagation, Snell's law governs the refraction and reflection of incident light 216 in any embodiment of an electrically tunable optical cell described herein.

Figure 2B:
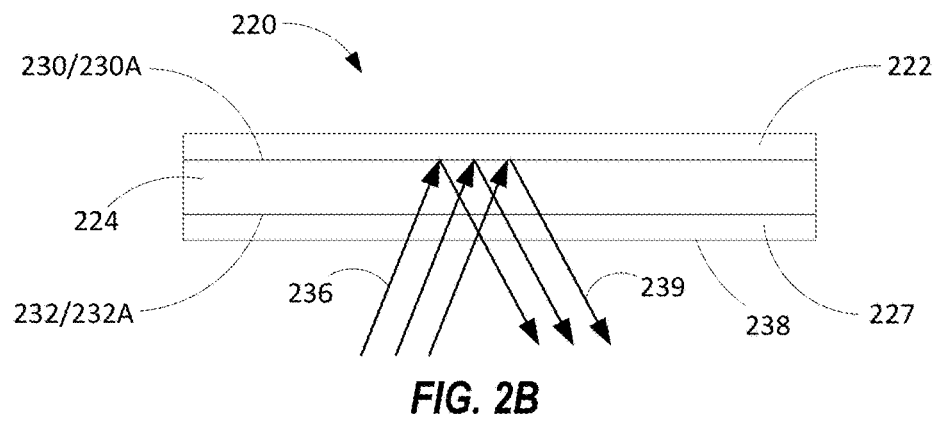
FIG. 2B is a side view of a reflective electrically tunable ionic liquid optical cell with a first opaque, reflective substrate, a second transparent substrate, and an internal cell volume containing an ionic liquid.

In other embodiments an electrically tunable ionic cell may be a reflective optical cell. FIG. 2B illustrates an embodiment of a reflective optical cell 220. The reflective optical cell 220 has a first substrate 222, which may be opaque or transparent, and a second transparent substrate 227 that opposes the first substrate 222 and is spaced apart from, and therefore not in direct contact with, the first substrate 222. The first substrate 222 has a first internal surface 230, and the second transparent substrate 227 has a second transparent internal surface 232. The first and second internal surfaces 230 and 232 are configured as two boundaries of an internal cell volume 224, which may contain an ionic liquid, and more specifically, an RTIL. The first internal surface 230 may be coated with an electrically conductive first opaque or reflective layer or film 230A (e.g., a thin film of metal such as silver) facing the internal cell volume 224. One or more voltage sources may provide a voltage to the reflective optical cell 220 in capacitive and/or resistive configurations, as has been described herein, but for the sake of simplicity a voltage source is not shown in FIG. 2B. The reflective optical cell 220 of FIG. 2B is one embodiment of an optically reflective optical cell able to reflect incident light 236 on an opaque layer 230A on the first internal surface 230 of the first transparent substrate 222, resulting in reflected light 239 exiting the reflective optical cell 220 out of a second transparent external surface 238 of the second transparent substrate 227. In other embodiments, a second transparent electrically conductive layer 232A on the second transparent internal surface 232 may be implemented in capacitive or resistive configurations, to provide a voltage to and/or a current across the conductive layer 232A on the second transparent internal surface 232. In another embodiment the conductive film 230A on the first internal surface may be transparent and the first substrate 230 may be opaque or reflective. In any embodiment with a reflective thin film or layer 230A on the first internal surface 230 or an opaque or reflective first substrate 222, the first and second substrates 222 and 227 of the reflective optical cell 220 are configured for incident light 236 to enter the optical cell 220 through the second transparent external surface 238 and pass through the second transparent substrate 227, pass through the second transparent internal surface 232, pass through the internal cell volume 224 which may contain an RTIL, and reflect off of either the opaque layer or film 230A on the first internal surface 230 or off of the first internal surface 230 of the first substrate 222. Reflected light 239 may then pass back through the internal cell volume 224, pass back through the second transparent internal surface 232, pass back through the second transparent substrate 227, and exit the reflective optical cell 220 through the second transparent external surface 238.

Figure 2C:
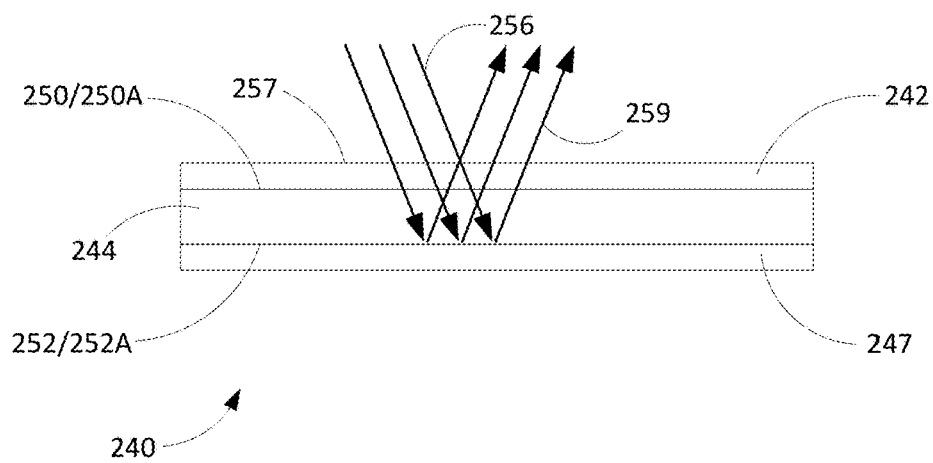
FIG. 2C is a side view of a reflective electrically tunable ionic liquid optical cell with a first transparent substrate, a second opaque, reflective substrate, and an internal cell volume containing an ionic liquid.

FIG. 2C illustrates yet another embodiment of a reflective optical cell 240. The reflective optical cell 240 has a first transparent substrate 242, and a second substrate 247, which may be transparent or opaque, that opposes the first transparent substrate 242 and is spaced apart from, and therefore not in direct contact with, the first transparent substrate 242. The first transparent substrate 242 has a first transparent internal surface 250, and the second substrate 247 has a second internal surface 252. The first and second internal surfaces 250 and 252 are configured as two boundaries of an internal cell volume 244, which may contain an ionic liquid, and more specifically, an RTIL. The second internal surface 252 may be coated with an electrically conductive opaque or reflective layer or film 252A (e.g., a thin film of metal such as silver) facing the internal cell volume 244. One or more voltage sources may provide a voltage to the reflective optical cell 240 in capacitive and/or resistive configurations, as has been described herein, but for the sake of simplicity a voltage source is not shown in FIG. 2C. The reflective optical cell 240 of FIG. 2C is one embodiment of an optically reflective optical cell able to reflect incident light 256 on an opaque layer on the second internal surface 252 of the second substrate 247, resulting in reflected light 259 exiting the reflective optical cell 240 out of a first transparent external surface 257 of the first transparent substrate 242. In other embodiments, a first transparent electrically conductive layer 250A on the first transparent internal surface 250 may be implemented in capacitive or resistive configurations, to provide a voltage to and/or a current across the conductive layer 250A on the first transparent internal surface 250. In another embodiment, the conductive film 252A on the second internal surface 252 may be transparent and the second substrate 247 may be opaque or reflective. In any embodiment with a reflective thin film or layer 252A on the second internal surface 252 or an opaque or reflective second substrate 247, the first and second substrates 242 and 247 of the reflective optical cell 240 are configured for incident light 256 to enter the optical cell 240 through the first transparent external surface 257 and pass through the first transparent substrate 242, pass through the first transparent internal surface 250, pass through the internal cell volume 254 which may contain an RTIL, and reflect off of either the opaque layer or film on the second internal surface 252 or off of the second internal surface 252 of the second substrate 247. Reflected light 259 may then pass back through the internal cell volume 244, pass back through the first transparent internal surface 250, pass back through the first transparent substrate 242, and exit the reflective optical cell 240 through the first transparent external surface 257.

In any of the embodiments described herein, one or more voltage sources may be electrically connected to an electrically tunable ionic liquid optical cell by means of electrical connections to any number of substrates, and/or internal surfaces, and/or conductive layers or films on internal surfaces. In embodiments, the voltage source may be configured to apply a voltage differential across a single substrate, or a single internal surface. Alternatively, voltage source may be configured to provide voltages across multiple substrates and/or internal surfaces. In addition, voltage sources may be electrically connected to an optical cell in a capacitive configuration, a resistive configuration, or any combination of configurations with connections to any number of substrates and/or internal surfaces. In embodiments, the one or more voltage sources may be electrically connected to a substrate, an internal surface, and/or a conductive layer or film on an internal surface, at two or more locations. The one or more voltage sources may be electrically connected to the optical cell via electrical leads, wires, connectors, etc. in contact with at least one of a substrate, an internal surface, and/or a conductive layer or film on an internal surface.

Referring again now to FIG. 1A, the optical cell 100 is configured in a resistive configuration with the voltage source 114 electrically connected to the optical cell 100 to provide a voltage differential across the first internal surface 110 of the first substrate 102. Although the voltage source 114 is not electrically connected to the second substrate 107 or the second internal surface 112, a second film or layer 112A may be present on the second internal surface 112. In other embodiments, a first conductive layer or film 110A may be present on the first internal surface 110, and a second conductive layer or film 112A may be present on the second internal surface 112, and a voltage source 114 may be electrically connection to both the first conductive layer, and the second conductive layer (not pictured) to provide voltage differentials across both the first conductive layer and the second conductive layer. The applied voltages across the first and second conductive layers 110A, 112A may or may not be the same (i.e., the applied voltages can be independently controlled to be the same or different from each other), and therefore the induced currents across the first and second conductive layers may not be the same. The voltage source 114 may be a single voltage source apparatus capable of delivering multiple applied voltages, or a plurality of voltage source apparatus each capable of delivering one or more applied voltages to the first and second conductive layers 110A, 112A. Although the above embodiment considers only a first and a second conductive layer, in other embodiments the single or plurality of voltage source apparatus may provide voltage differentials to any number of conductive layers, internal surfaces, and/or substrates as desired.

Figure 3A:
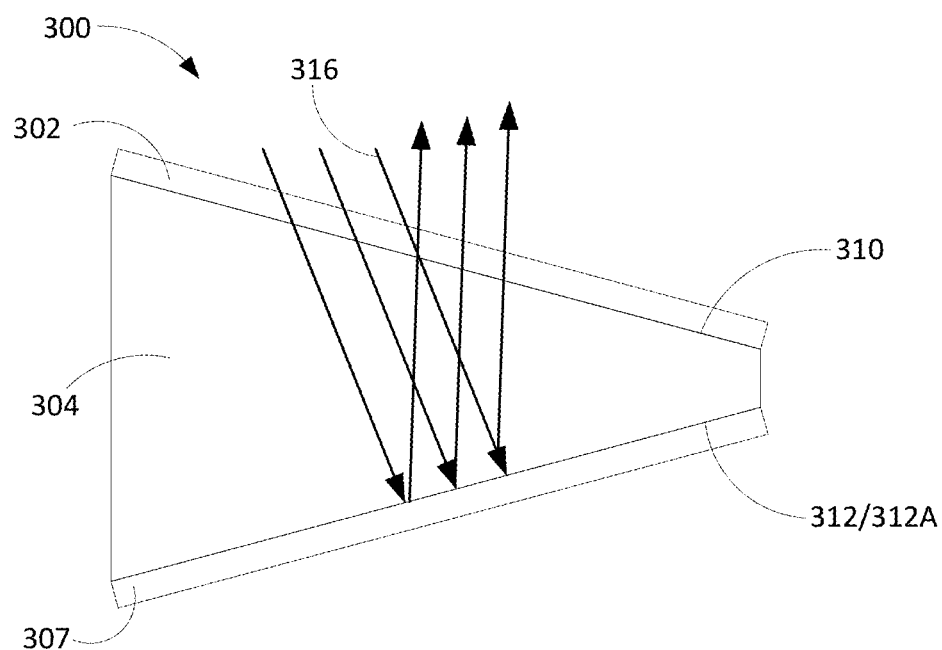
FIG. 3A is a side view of an electrically tunable ionic liquid optical cell with a first and second substrate, the first and second substrates being non-parallel, and an internal cell volume containing an ionic liquid.

In embodiments, the first and second substrates of an electrically tunable ionic liquid optical cell may be non-parallel, planar substrates. FIG. 3A illustrates the side view of a non-parallel electrically tunable ionic liquid optical cell 300 with a first transparent substrate 302 and a second reflective substrate 307. The first transparent substrate 302 and the second reflective substrate 307 are planar, and the second reflective substrate 307 opposes the first substrate 302 and is spaced apart from, and therefore not in direct contact with, the first transparent substrate 302. The first transparent substrate 302 has a first transparent internal surface 310, and the second reflective substrate 307 has a second internal surface 312, for example with a second layer 312A thereon. The first transparent internal surface 310 and the second internal surface 312 are not parallel in the embodiment of the optical cell 300, and are configured as two boundaries of an internal cell volume 304. In contrast to the top view of the rectangular internal cell volumes of the embodiments illustrated in FIGS. 1A, 1B, 2A, 2B, and 2C, the side cross-section of the internal cell volume 304 of FIG. 3A is a trapezoid due to the non-parallel first transparent substrate 302 and the second reflective substrate 307. Incident light 316 on the second internal surface 312 of the second reflective substrate 307 may be reflected in directions different than that of a parallel optical cell, such as those illustrated in FIGS. 1A, 1B, 2A, 2B, and 2C. Unique substrate shapes and geometries may be employed to reflect, refract, transmit, or otherwise guide or direct light to propagate in a variety of desired ways.

Figure 3B:
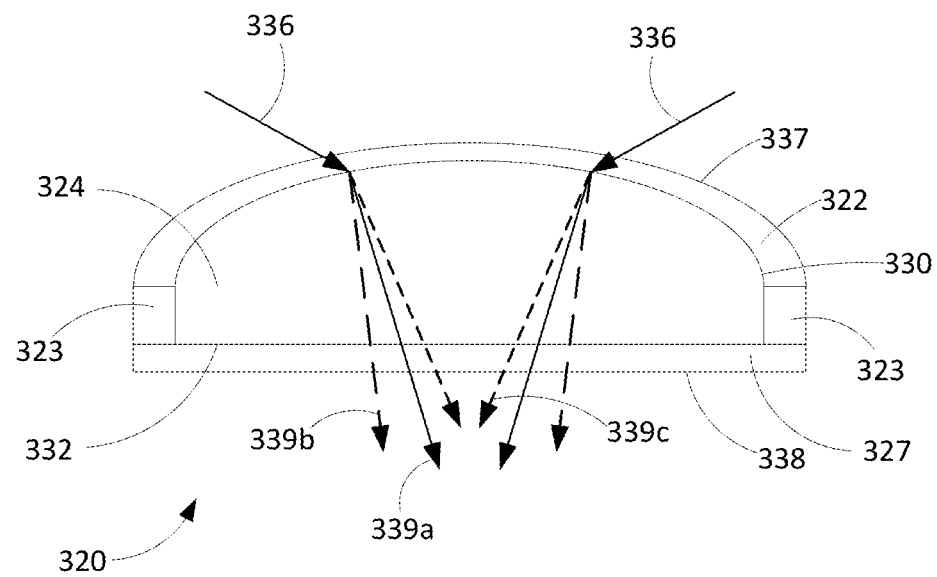
FIG. 3B is a side view of an electrically tunable ionic liquid optical cell with a first curved substrate, a second flat planar substrate, and an internal cell volume containing an ionic liquid.

In addition, the substrates of an optical cell may be other than flat planar substrates, and may therefore have a concave or convex curvature. FIG. 3B illustrates a top view of a non-planar electrically tunable ionic liquid optical cell 320 with a curved first transparent substrate 322, and a planar second transparent substrate 327. The curved first transparent substrate 322 has a first transparent internal surface 330, and the second transparent substrate 327 has a second transparent internal surface 332. The curved first transparent substrate 322 and the planar second transparent substrate 327 oppose each other and are spaced apart by sealing structures 323. The first transparent internal surface 330, the second transparent internal surface 332, and the sealing structures 323 define the boundaries of an internal cell volume 324, that may contain an RTIL. The sealing structures 323 may be O-rings or any other suitable sealing structure to contain an ionic liquid within the internal cell volume 324. Incident light 336 on a first external surface 337 of the curved first transparent substrate 322 passes through the first external surface 337, through the curved first transparent substrate 322, and through the first transparent internal surface 330. The incident light 336 may refract at the interface between the first transparent internal surface 330 and the internal cell volume 324 due to a difference in the index of refraction between the curved first transparent substrate 322 and an RTIL in the internal cell volume 324. The refracted light 339a may pass through the internal cell volume 324, through the second transparent internal surface 332, through the planar second transparent substrate 327, and exit the non-planar optical cell 320 through a second external surface 338 of the planar second transparent substrate 327. Unlike the transmissive optical cell 200 of FIG. 2A, where the incident light 216 enters and exits the optical cell at the same angle, FIG. 3B illustrates that the refracted light 339a may exit the non-planar optical cell 320 at very different angles than the incident light 336 enters the cell. It should be noted that such an embodiment of a non-planar optical cell 320 may constitute a lensing optical cell causing optical rays to converge or diverge depending on the concave or convex structures of the non-planar substrates employed.

The index of refraction of an RTIL contained inside of the internal cell volume 324 of the non-planar optical cell 320, may be altered by inducing a current across the first and/or second transparent internal surfaces 330 and 332, and therefore inducing a charge gradient in the RTIL. An induced increase in the index of refraction of the RTIL results in greater refraction of the incident light 336, causing refracted light 339b to exit the non-planar optical cell 320 at angles further deviated from the angle of incidence of the incident light 336 than the refracted light 339a due to the non-induced intrinsic refractive index of the RTIL. Conversely, an induced decrease in the index of refraction of the RTIL results in less refraction causing refracted light 339c to exit the non-planar optical cell 320 at angles closer to the angle of incidence of the incident light 336. The direction of the induced current across the first and/or second transparent internal surfaces 330 and 332 determines whether the index of refraction of the RTIL increases or decreases, allowing for the control of the refraction of light through the non-planar optical cell 320. Due to the tunability and control of the refractive index of the RTIL inside of the internal cell volume 324, the non-planar optical cell 320 may be implemented as a tunable lens with a variable focal length depending on the direction and amplitude of an applied current across the first and/or second transparent internal surfaces 330 and 332.

In other embodiments, the sealing structures 323 may be extending sidewalls of either the non-planar first transparent substrate 322 or the planar second transparent substrate 327 removing the need for a separate sealing structure such as an O-ring. In yet other embodiments the non-planar first transparent substrate 322 and the planar second transparent substrate 327 may be a single piece of material surrounding a cavity corresponding to the internal cell volume 324 which may contain an RTIL. As previously discussed, it is desirable in any embodiment of an electrically tunable ionic liquid optical cell with first and second substrates in direct contact, or made from the same material, for the substrate materials to be non-conductive, and therefore a conductive thin film or layer may be present on the internal surfaces of the substrates to enable the conduction of a current across an internal layer, and to induce a charge gradient in an RTIL contained within the internal cell volume 324. Conductive coatings on the internal surface of the first and seconds substrates may be in direct contact with the RTIL contained within an internal volume, and in any embodiments the first and second substrates and the first and second internal surfaces may be either opaque, reflective, or transparent as desired.

Figure 4A:
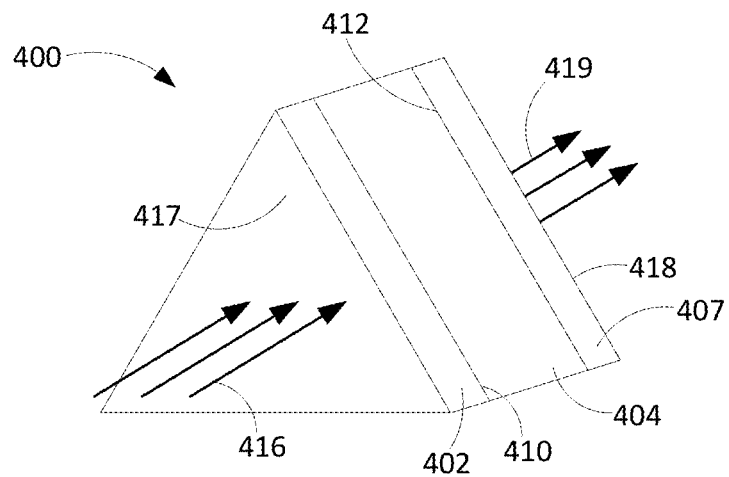
FIG. 4A is a perspective view of a triangular electrically tunable ionic liquid optical cell with first and second triangular planar substrates, and an internal cell volume containing an ionic liquid.
Figure 4B:
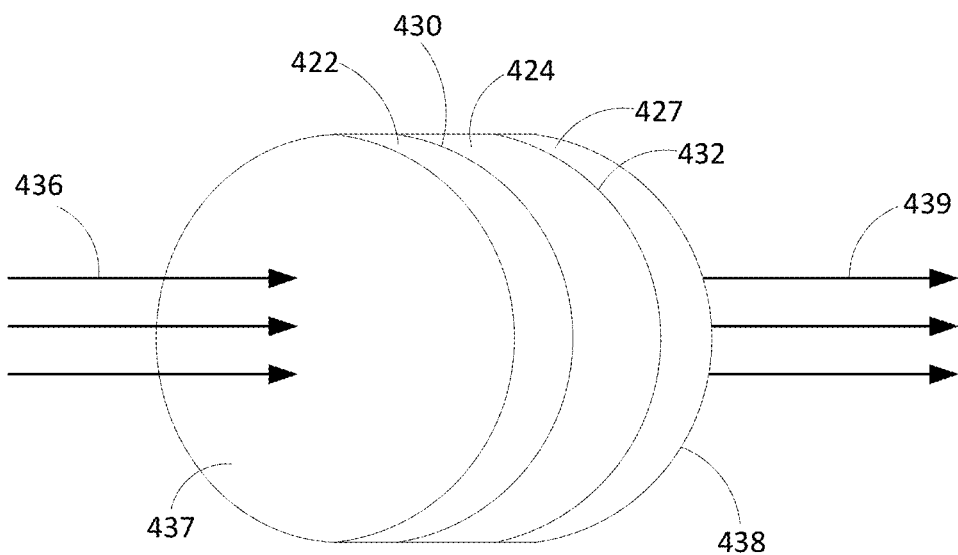
FIG. 4B is a perspective view of a circular electrically tunable ionic liquid optical cell with first and second circular planar substrates, and an internal cell volume containing an ionic liquid.

FIGS. 4A and 4B illustrate non-rectangular planar electrically tunable ionic liquid optical cells 400 and 420. FIG. 4A illustrates a triangular optical cell 400 with a triangular first transparent substrate 402, that has a first external surface 417 and a first internal surface 410, and a triangular second transparent substrate 407 that has a second external surface 418 and a second internal surface 412. The first and second internal surfaces 410 and 412 are separate from each other, opposing, and parallel, and form between them a triangular internal cell volume 404 which may contain an ionic liquid or RTIL. Incident light 416 on the first external surface 417 may pass through the first external surface 417, through the triangular first transparent substrate 402, through the first internal surface 410, through the triangular internal cell volume 404, which may contain an RTIL, through the second internal surface 412, through the triangular second substrate 407, through the second external surface 418, and exit the triangular optical cell 400 as transmitted light 419.

FIG. 4B illustrates another embodiment of a non-rectangular planar electrically tunable ionic liquid optical cell. FIG. 4B illustrates a circular optical cell 420 with a circular first transparent substrate 422, that has a first external surface 437 and a first internal surface 430, and a circular second transparent substrate 427 that has a second external surface 438 and a second internal surface 432. The first and second internal surfaces 430 and 432 are separate from each other, opposing, and parallel, and form between them a circular internal cell volume 424 which may contain an ionic liquid or RTIL. Incident light 436 on the first external surface 437 may pass through the first external surface 437, through the circular first transparent substrate 422, through the first internal surface 430, through the circular internal cell volume 424, which may contain an RTIL, through the second internal surface 432, through the circular second substrate 427, through the second external surface 438, and exit the circular optical cell 420 as transmitted light 439.

In the embodiments of the non-rectangular planar triangular and circular optical cells 400 and 420 of FIGS. 4A and 4B, one or more voltage sources may be electrically connected, in a resistive or capacitive configuration, to one or more substrates, internal surfaces, or thin films or layers on any internal surfaces to provide a voltage differential, and/or a current across the substrate, internal surface, and/or thin film or layer. In addition, while the non-rectangular planar optical cells, and substrates, illustrated in FIGS. 4A and 4B are triangular and circular respectively, an optical cell may be any planar, or non-planar, geometric shape or design. For example, a non-planar substrate, such as the curved first transparent substrate 322 of FIG. 3B, that is also an elliptical substrate, similar to the circular first transparent substrate 422 of FIG. 4B, may be implemented to create a tunable focal length elliptical lens useful in manipulated elliptical beams of light, or for unique optical sensor arrangements.

In any embodiment, the first substrate and the second substrate independently may be a material selected from glass, (optical grade) polymers, diamond, and combinations thereof (e.g., as layered composite materials). Example optical grade polymers/plastics may include polycarbonate (PC), polystyrene (PS), and acrylics such as poly(methyl methacrylate) (PMMA). Diamond may be used as a substrate, for example a single crystal diamond or polycrystalline diamond substrate formed without any electrically (semi)conducting dopants such as boron (p-type dopant) or phosphorous (n-type dopant). In an embodiment, a non-conductive diamond substrate may be grown/synthesized (e.g., using microwave plasma assisted chemical vapor deposition, such as with a deposition source gas free from (semi)conductive dopants), and then the deposition source gas may be changed to include a p- or n-type dopant to deposit a very thin transparent, conducting diamond layer thereon. In any embodiment, first and second substrates may be formed from the same or different materials, and they may either include or be formed exclusively from the foregoing specific materials or combinations thereof.

In embodiments, the first substrate and the second substrate are electrically non-conductive. The substrate may be formed from non-conductive materials, such as those having an electrical conductivity of about $10^{-8}$ S/m or less. For example, glass has representative electrical conductivity values of about $10^{-11}$ S/m to $10^{-15}$ S/m, and diamond has representative values of about $10^{-11}$ S/m to $10^{-18}$ S/m. Suitable resistances for the substrates may be at least 1, 2, or 5 $\Omega$/sq. and or up to 10, 20, or 50 $\Omega$/sq. (e.g., sheet resistance expressed as ohms-per-square, such as determined by a four point probe technique).

In embodiments, the first substrate and the second substrate are spaced apart by a distance of at least 50 μm. It is preferable that the separation distance of the first and second substrates be comparable to, or higher than the length scale over which the charge density gradient induced in an RTIL is non-zero as measured from the first internal surface of the first substrate, or first layer, which is at least about 50-100

μm. Local regions where the charge density gradient is non-zero correspond to the local regions where the index of refraction of the ionic liquid can be controlled or adjusted. In embodiments, the separation distance of the first and second internal surfaces of the first and second substrates is at least 50, 100, 150, or 200 μm and/or up to 100, 200, 300, 500, 1000, or 2000 μm. Separation distances greater than thickness of the region where charge density gradient is non-zero can be practical or desirable from a manufacturing/assembly perspective, even if they result in regions in the internal cell volume where, during operation, the charge density gradient is essentially zero, i.e., regions where there is little or no local control over the index of refraction in the local region. The separation distance of the first and second internal surfaces of the first and second substrates may be the shortest or average distance between the first and second internal surfaces when the two substrates are not spaced apart by a uniform distance across their entire surfaces, such as when at least one substrate has a curved surface facing the internal cell volume, e.g. the non-planar optical cell 320 of FIG. 3B, and/or when the two substrates are generally angled/non-parallel relative to each other, e.g. the non-parallel optical cell 300 of FIG. 3A.

In embodiments with a first and second layer on corresponding first and second internal surfaces, the first layer and the second layer may independently be a material selected from the group consisting of transparent conductive metal oxides, transparent conductive polymers, transparent semiconducting diamonds, transparent conductive carbons, transparent metal films, and/or combinations thereof (e.g., as blends or mixtures). The materials may be transparent in their bulk form, or they may be sufficiently thin layers to be essentially transparent as applied to their substrates (e.g., thin enough to have an optical density of 0.1 or less). The choice of material for the first and second layers may depend on the wavelengths of light of interest, desired thickness of the device, and other parameters. Potential transparent conductive metal oxides for forming the first and/or second layer or film may include indium tin oxide (ITO; or tin-doped indium oxide), fluorine-doped indium tin oxide (FTO), indium zinc oxide (IZO), aluminum zinc oxide (AZO). Potential transparent semiconducting conductive polymers for forming the first and/or second layer or film include polyacetylenes, polyphenylene vinylenes, polypyrroles, polythiophenes, polyanilines, and polyphenylene sulfides. Potential transparent semiconducting diamonds for forming the first and/or second layer or film include boron-doped diamond (p-type dopant) or phosphorous-doped diamond (n-type dopant). Potential transparent conductive carbons for forming the first and/or second layer or film include graphene films and carbon nanotube films that are thin enough to be transparent. Potential transparent metal films for forming the first and/or second layer or film include any evaporated metal film thin enough to be transparent. In other embodiments with reflective substrates, layer, films, and/or internal surfaces, may use metal films (e.g., silver) or other materials that are conductive but non-transparent (e.g., due to their thickness or otherwise) as an opaque or reflective layer. The first and second layers or films may be formed from the same or different materials, and the first and second layers or films may either include or be formed exclusively from the foregoing specific materials or combinations thereof.

In embodiments with a first and/or second layer on the first and second internal surfaces, the first layer and the second layer may independently have an electrical conductivity of about $10^4$ S/m or more (e.g., about $10^4$ S/m, $10^5$ S/m, or $10^6$ S/m or more and/or up to about $10^6$ S/m, $10^7$ S/m, or $10^8$ S/m). For example, electrical conductivity values of about $10^5$-$10^6$ S/m are representative for various transparent conducting metal oxides and values of about $10^5$ S/m are representative for graphite. In some embodiments, materials with relatively lower electrical conductivity values may be used, in particular with relatively low thickness values (e.g., thus increasing the fraction of surface atoms/molecules, even if at a relatively lower current values).

In embodiments with first and/or second layers or films on first and second internal surfaces, the first layer and second layer may independently have a thickness of 10 μm or less (e.g., 10, 5, 2, 1, 0.5, 0.2, 0.1, 0.05, 0.02, 0.01 μm or less and/or 0.3, 0.5, 1, 2, 5, 10, 20, 50, 100, 200, 500, or 1000 nm or more.) Conductive thin films are suitable, and even desirable, because the surface charge on the layer, and not buried charge within a thick layer or the substrate, mediates the charge density gradient, and therefore the index of refraction, in the ionic liquid. Thus, the first and second conducting layers are suitably as thin as possible, because it is the external surface of the layer (i.e., facing the internal cell volume and in contact with the ionic liquid) where the electrical current/charge density is relevant for inducing the charge density gradient in the adjacent ionic liquid or RTIL. The lower limit of a monolayer of material (e.g., being a single atom, molecule, lattice unit, monomer unit, etc. thick) would have only external surface conduction. Bilayers or other multilayers of a material only several atomic, molecular, lattice, or monomer layers (e.g., 2-10) thick would similarly be suitable for increasing the relative fraction of external surface conduction. In embodiments with transmissive substrates and/or internal surfaces, the first transparent layer and the second transparent layer may independently have an optical transmittance of at least 80% (e.g., at least 80, 85, 90, or 95% and/or up to 90, 95, 98, 99, or 100%).

In embodiments, the ionic liquid is a cationic moiety selected from the group consisting of a pyridinium, pyridazinium, pyrimidinium, pyrazinium, oxazinium, thiazinium, imidazolium, pyrazolium, thiazolium, isothiazolium, oxazolium, isoxazolium, and triazolium cationic moieties. Ionic liquids are typically colorless. In other embodiments, the ionic liquid may further be one or more organic substituents selected from the group consisting of alkyl groups and aryl groups. Organic substituents can be pendant groups from the cationic moiety, in particular a pendant group from one or more ring carbon atoms or ring (positively charged) nitrogen atoms replacing a hydrogen atom. Each organic substituent independently may be linear or branched alkyl of 1 to 20 carbon atoms (e.g., substituted or unsubstituted), aryl of 6 to 20 carbon atoms (e.g., substituted or unsubstituted). In yet other embodiments, the ionic liquid further may be a counter anion selected from the group consisting of sulfate, hydrogen sulfate, nitrate, fluoride, chloride, bromide, iodide, methyl sulfonate, and fluoroborate anions. Other counter anions can include $CN^-$, $NCS^-$, $NCO^-$, $OCN^-$, $(CF_3SO_2)_2N^-$, and $PF_6^-$.

In any embodiment of an electrically tunable ionic liquid optical cell with an ionic liquid or an RTIL, the RTIL completely fills the internal cell volume, i.e. the internal cell volume is suitably free from any additional fluid (e.g., liquid or gas phase generated headspace) phases that are immiscible with the RTIL. In addition, the internal cell volume is generally free from materials other than ionic liquids. For example, the internal cell volume may be full or substantially full (such as having no air or other gas headspace or pockets) with the ionic liquid, which may include a mixture of two or more different ionic liquid species. Suitably, any components other than ionic liquids are present in amounts of 5, 2, 1, or 0.1 wt. % or less based on the weight of the liquid medium containing the ionic liquid(s) (e.g., free from such other additional components).

Figure 5A:
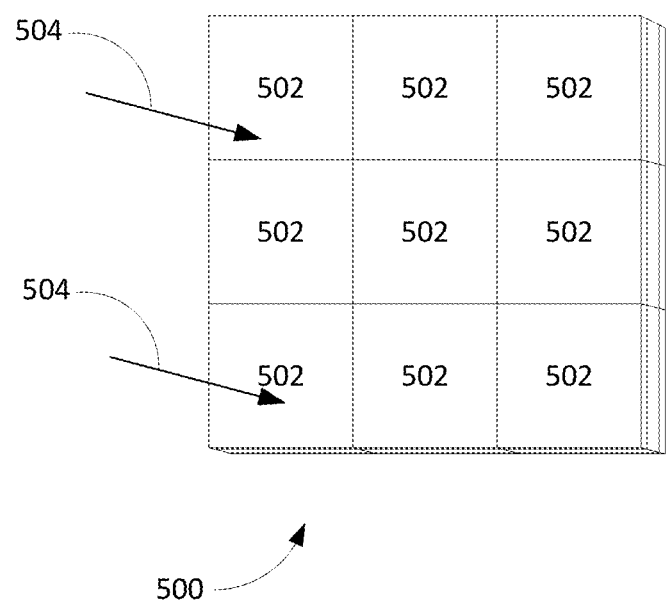
FIG. 5A is an illustration of an array of electrically tunable ionic liquid optical cells in a parallel spatial and optical arrangement.
Figure 5B:
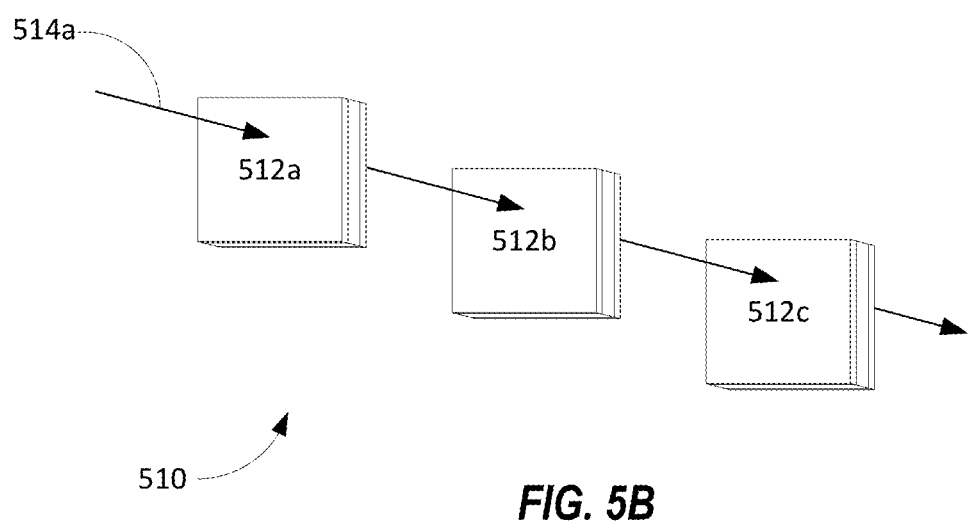
FIG. 5B is an illustration of an array of electrically tunable ionic liquid optical cells in a series spatial and optical arrangement.

Referring now to FIGS. 5A and 5B, any of the embodiments of electrically tunable ionic liquid optical cells may be configured to form an electrically tunable ionic liquid optical cell array. FIG. 5A illustrates a parallel optical cell array 500, with optical cells 502 spatially configured such that light 504 entering one optical cell 502 in the parallel optical cell array 500 does not enter into a second optical cell 502 of the parallel optical cell array 500. The parallel optical cell array 500 constructs a pixel-like structure where the optical cells 502 may be used to manipulate the propagation of light in a 2-dimensional pixel-like manner. FIG. 5B illustrates a series optical cell array 510, with optical cells 512a-512c spatially configured such that light 514 entering the first optical cell 512a, enters a second optical cell 512b, and further enters a third optical cell 512c. The series optical cell array 510 may be implemented to provide multistage attenuation or refraction of light, or to act as a multilayer wavelength filter, as well as for many other purposes. In other embodiments optical cells may be spatially positioned in a combination of both parallel and series configurations. Although not shown in FIGS. 5A and 5B, one or more voltage sources may provide voltage differentials across any number of substrates, surfaces, and/or layers or films of the optical cells. For example, a voltage source may be electrically connected at two or more locations of each first layer of the first internal surfaces, such as via electrical leads, wires, connectors, etc. in contact with each first layer. The applied voltage need not be the same across each optical cell layer (i.e., the applied voltages can be independently controlled to be the same or different from each other for each optical cell). The voltage source may be a single apparatus capable of delivering multiple applied voltages or a plurality of apparatus each capable of delivering one or more applied voltages to the different optical cells.

Figure 6:
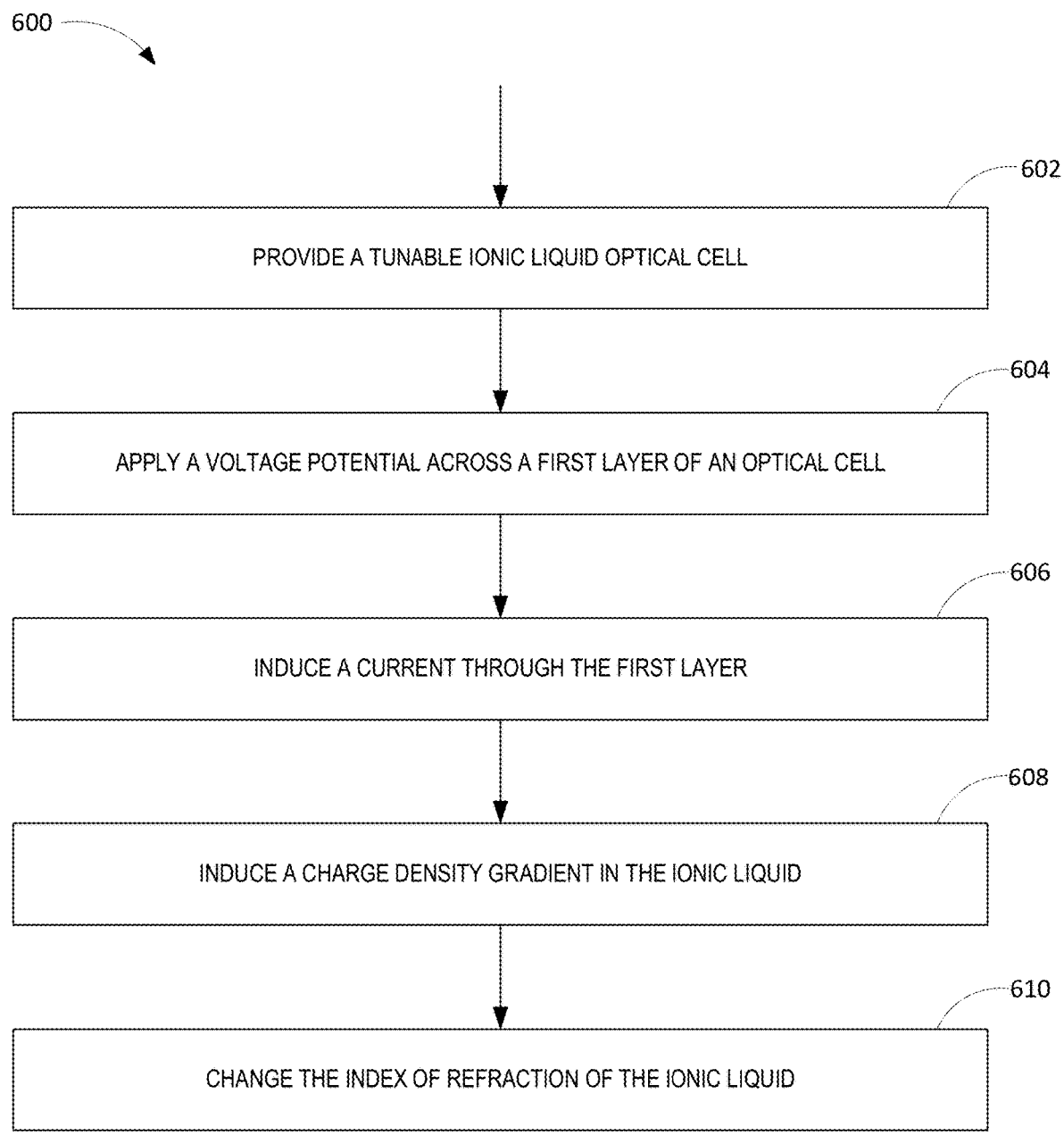
FIG. 6 is a flow diagram of an example method for electrically tuning the index of refraction of an ionic liquid in an optical cell.

FIG. 6 illustrates a flow diagram of an example method 600 for controlling the index of refraction of an ionic liquid contained within an internal cell volume of an optical cell. At a block 602, the method 600 may include providing an optical cell or an optical cell array according to any of the variously disclosed embodiments. At a block 604, the method may include applying a voltage differential across the first (transparent or opaque) layer and inducing an electrical current through the first (transparent or opaque) layer, at a block 606. At a block 608 the method 600 may further include inducing a charge density gradient in the ionic liquid and, at a block 610, changing the index of refraction of the ionic liquid in the internal cell volume. The change in index of refraction of the ionic liquid may be expressed relative to the ambient/bulk/intrinsic index of refraction value for the ionic liquid in the absence of any charge density gradient. The change in index of refraction may be an increase or decrease relative to the ambient/bulk/ intrinsic value.

EXAMPLES

The following examples illustrate the disclosed apparatus and method, but are not intended to limit the scope of any of the claims thereto.

Preparation of Ionic Liquid Solutions: The RTIL BMIM$^+$ BF$_4^-$ (Sigma-Aldrich, neat concentration 5.35 M) was purified using activated carbon, heated to 70° C., and then purged with ultrapure Ar. Cresyl violet perchlorate (CV$^+$; available from Eastman Kodak) was added to BMIM$^+$BF$_4^-$ at a final concentration of 5×10$^{-5}$ mol L$^{-1}$ of the CV$^+$ chromophore. The internal cell volume of a cell configured as illustrated in FIG. 1A was filled with the RTIL solution including the chromophore.

Electrode and Cell Preparation: Both FTO (Solaronix, TCO22-7, 7 Ω/sq) and ITO (Nanocs Inc., IT10-111-25, 10 Ω/sq) coated supports were cleaned with soap, isopropanol, and ethanol, then dried, and then cleaned using an UV/ozone cleaner. Electrical connections were applied to the FTO or ITO surface using conductive (silver-filled) epoxy. A silicone rubber sheet (MSC Direct) was cut to form the optical cell spacer or sealing structure (ca. 1 mm thick). The optical cell was assembled as illustrated in FIG. 1A.

Fluorescence Anisotropy Decay Depth Profiling: A Nikon Eclipse Ti-U inverted microscope is equipped with a confocal scanning head (B&H DCS-120) that has two time-resolved, polarized detection channels, each with an avalanche photo-diode (ID Quantique I D100). The fluorescence transients are processed electronically using commercial time-correlated single-photon counting gear (B&H SPC-152). The light source is a synchronously pumped cavity-dumped dye laser (Coherent 702-2) operating at 563 nm (5 ps pulses, 4 MHz repetition rate). The dye laser is excited by the second harmonic output of a passively mode-locked Nd:YVO$_4$ laser (Spectra Physics Vanguard) producing 13 ps pulses at 80 MHz repetition rate with 2.5 W average power at 532 nm.

Characterization of the Free Charge Density Gradient: The existence of reorganization in the form of a free charge density gradient, $p_f$, in an RTIL, can be demonstrated through the measurement of the rotational diffusion time constant of charged chromophores in the RTIL, as a function of distance from a charged surface. To demonstrate the ability to control the charge density gradient in BMIM$^+$ BF$_4^-$, the cationic chromophore cresyl violet (CV$^+$) was used because of its favorable and well-characterized optical properties.

An electrically tunable optical cell in a resistive configuration, as illustrated in FIG. 1A, was built with silica as the material making up the first and second substrates 102 and 107, an O-ring as the sealing structure 117, with the RTIL/ chromophore solution contained within the internal cell volume 104, and with either an ITO or FTO conductive transparent coating 110A or 112A on the first or second internal surfaces 110 and 112.

Figure 7A:
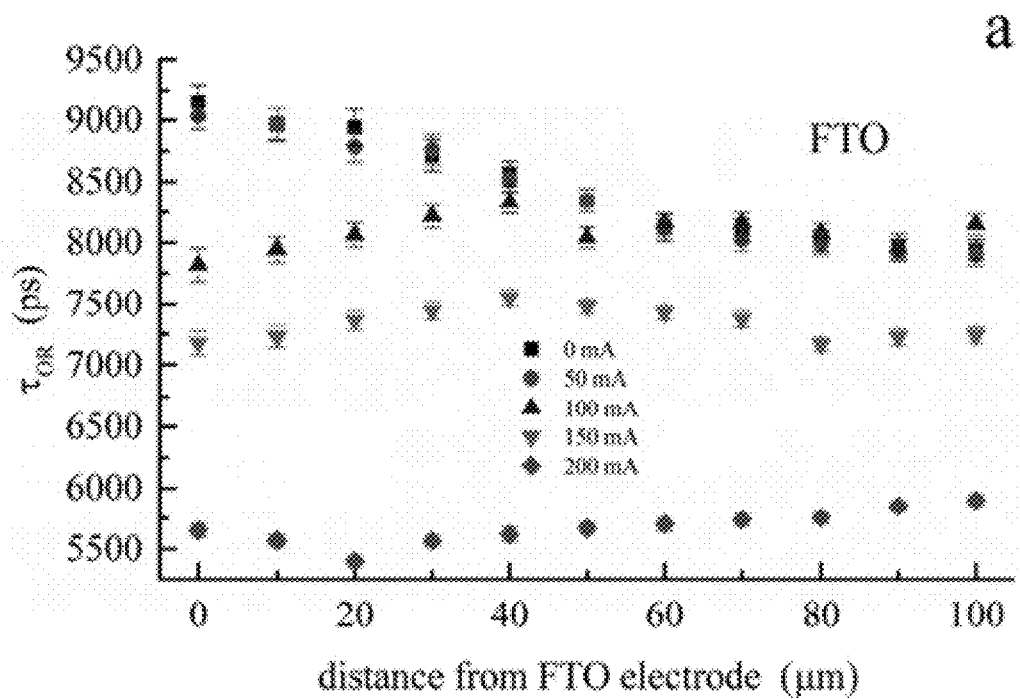
FIG. 7A is a graph showing the reorientation time constant of a $CV^+$ chromophore with induced currents from 0 mA to 200 mA across an FTO conducting film in an optical cell according to the disclosure.
Figure 7B:
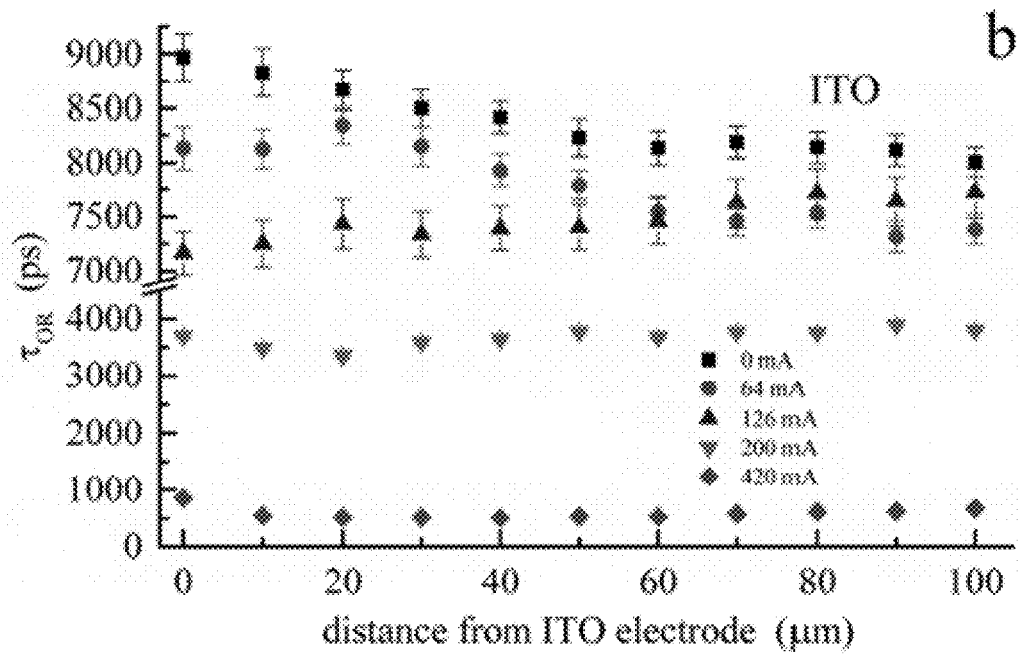
FIG. 7B is a graph showing the reorientation time constant of a $CV^+$ chromophore with induced currents from 0 mA to 420 mA across an ITO conducting film in an optical cell according to the disclosure.

FIGS. 7A and 7B show plots of the reorientation time constant, $\tau_{OR}$, of CV$^+$ as a function of the distance from the charged surface, with various induced currents across the charged surface. FIG. 7A presents data showing the reorientation time constant of CV$^+$ with induced currents from 0 mA to 200 mA across an FTO conducting film 110A on an internal surface 110 of a first substrate 102 of an optical cell 100, and FIG. 7B likewise presents data showing the reorientation time constant of CV$^+$ with induced currents from 0 mA to 420 mA across an ITO conducting film 110A on an internal surface 110 of a first substrate 102 of an optical cell 100. FIGS. 7A and 7B demonstrate that the induced charge gradient in the RTIL depends solely on the conducting plate having the induced current, enabling the resistive configuration of electrically tunable ionic liquid optical cells as an effective configuration for inducing a charged gradient in an RTIL. It is also significant to note that the direction of the gradient can be changed with the application of 150 mA for the FTO, and nearly 200 mA for the ITO. Also, as greater currents are induced across the FTO or ITO, the induced free charge density gradient in the RTIL extends further from the FTO or ITO layer. For example, in FIG. 7B, both the 200 mA and the 420 mA cases show induced free charge density gradients at distances of 100 microns or greater. The applied currents in FIGS. 7A and 7B are greater than the expected values based on theory which is most likely due to the finite thickness of the FTO and ITO layers. As previously discussed, only the surface charge density of the FTO or ITO induces a charge gradient in the RTIL, therefore the finite layer thickness and other material properties (e.g., dopant level, grain boundaries, defects, buried charge) cause only a fraction of the current to pass across the surface of the FTO or ITO. Further independent measurements (not shown) demonstrate that the effects illustrated in FIGS. 7A and 7B are not the result of Joule heating or other thermal gradient, instead being the result of an induced charge density gradient.

While the disclosed apparatus, compounds, methods and compositions are susceptible of embodiments in various forms, specific embodiments of the disclosure are illustrated with the understanding that the disclosure is intended to be illustrative, and is not intended to limit the claims to the specific embodiments described and illustrated herein. Further, because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the apparatus, compounds, compositions, methods, and processes are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

PARTS LIST 100 electrically tunable ionic liquid optical cell
102 first substrate
104 internal cell volume
107 second substrate
110 first internal surface
110A first layer
112 second internal surface
112A second layer
114 voltage source
117 sealing structure
120 optical cell
124 voltage source
200 transmissive optical cell
202 first transparent substrate
204 internal cell volume
207 second transparent substrate
210 first transparent internal surface
210A first layer
212 second transparent internal surface
214 voltage source
216 incident light
217 first transparent external surface
218 second external transparent surface
220 reflective optical cell
222 first substrate
224 internal cell volume
227 second transparent substrate
230 first internal surface
230A first layer
232 second transparent internal surface
232A second layer
236 incident light
238 second transparent external surface
239 reflected light
240 reflective optical cell
242 first transparent substrate
244 internal cell volume
247 second substrate
250 first transparent internal surface
250A first layer
252 second internal surface
252A second layer
256 incident light
257 first transparent external surface
259 reflected light
300 non-parallel optical cell
302 first transparent substrate
304 internal cell volume
307 second reflective substrate
310 first transparent internal surface
312 second internal surface
312A second layer
316 incident light
320 non-planar optical cell
322 curved first transparent substrate
323 sealing structure
324 internal cell volume
327 planar second transparent substrate
330 first transparent internal surface
332 second transparent internal surface
336 incident light
337 first external surface
338 second external surface
339a refracted light
339b refracted light
339c refracted light
400 triangular optical cell
402 triangular first transparent substrate
404 triangular internal cell volume
407 triangular second transparent substrate
410 first internal surface
412 second internal surface
416 incident light
417 first external surface
418 second external surface
419 transmitted light
420 circular optical cell
422 circular first transparent substrate
424 circular internal cell volume
427 circular second transparent substrate 430 first internal surface
432 second internal surface
436 incident light
437 first external surface
438 second external surface
439 transmitted light
500 parallel optical cell array
502 optical cell
504 light
510 series optical cell array
512a-c optical cell
514 light

What is claimed is:

1. An electrically tunable optical cell comprising:
   a first transparent substrate;
   a second transparent substrate opposing and spaced apart from the first transparent substrate, wherein the first transparent substrate and the second transparent substrate define an internal cell volume therebetween;
   an ionic liquid in the internal cell volume;
   a first transparent layer on a surface of the first transparent substrate facing the internal cell volume, wherein:
      the first transparent layer is electrically conductive, and
      the first transparent layer is adapted to receive a voltage differential across the first transparent layer and capable of inducing an electrical current through the first transparent layer;
   optionally a second transparent layer on a surface of the second transparent substrate facing the internal cell volume, wherein the second transparent layer is electrically conductive;
   a voltage source electrically connected to the first transparent layer; and
   two or more electrical connectors (i) in electrical connection with the first transparent layer at two or more locations, and (ii) in electrical connection with the voltage source;
   wherein the voltage source is adapted to (i) apply a voltage differential across the first transparent layer, and (ii) induce an electrical current through the first transparent layer via the two or more electrical connectors.

2. The optical cell of claim 1, wherein the first transparent substrate and the second transparent substrate independently comprise a material selected from glass, (optical grade) polymers, diamond, and combinations thereof.

3. The optical cell of claim 1, wherein the first transparent substrate and the second transparent substrate are electrically non-conductive.

4. The optical cell of claim 1, wherein the first transparent substrate and the second transparent substrate are spaced apart by a distance of at least 50 μm.

5. The optical cell of claim 1, wherein the ionic liquid comprises a cationic moiety selected from the group consisting of a pyridinium, pyridazinium, pyrimidinium, pyrazinium, oxazinium, thiazinium, imidazolium, pyrazolium, thiazolium, isothiazolium, oxazolium, isoxazolium, and triazolium cationic moieties.

6. The optical cell of claim 5, wherein the ionic liquid further comprises one or more organic substituents selected from the group consisting of alkyl groups and aryl groups.

7. The optical cell of claim 5, wherein the ionic liquid further comprises a counter anion selected from the group consisting of sulfate, hydrogen sulfate, nitrate, fluoride, chloride, bromide, iodide, methyl sulfonate, and fluoroborate anions.

8. The optical cell of claim 1, wherein the internal cell volume is substantially free from materials other than ionic liquids.

9. The optical cell of claim 1, wherein the first transparent layer and the second transparent layer (when present) independently comprise a material selected from the group consisting of transparent conductive metal oxides, conductive polymers, semiconducting diamonds, transparent conductive carbons, and combinations thereof.

10. The optical cell of claim 1, wherein the first transparent layer and the second transparent layer (when present) independently comprise a transparent conductive metal oxide selected from the group consisting of indium tin oxide (ITO), fluorine-doped indium tin oxide (FTO), indium zinc oxide (IZO), aluminum zinc oxide (AZO).

11. The optical cell of claim 1, wherein the first transparent layer and the second transparent layer (when present) independently have an electrical conductivity of about $10^4$ S/m or more.

12. The optical cell of claim 1, the first transparent layer and the second transparent layer (when present) independently have a thickness of 10 μm or less.

13. The optical cell of claim 1, wherein the second transparent layer is present.

14. The optical cell of claim 1, wherein the second transparent layer is present and is not in electrical connection with the voltage source.

15. The optical cell of claim 1, wherein the second transparent layer is present and is in electrical connection with the voltage source, which is further adapted to apply a voltage differential across the second transparent layer and induce an electrical current through the second transparent layer.

16. An electrically tunable optical cell array comprising: a plurality of optical cells according to claim 1.

17. A method for controlling index of refraction of an optical cell, the method comprising:
   providing an optical cell according to claim 1; and
   applying a voltage differential across the first transparent layer and inducing an electrical current through the first transparent layer, thereby further inducing a charge density gradient in the ionic liquid and changing the index of refraction of the ionic liquid in the internal cell volume.

* * * * *